US012094263B2

(12) United States Patent
Manabe

(10) Patent No.: US 12,094,263 B2
(45) Date of Patent: Sep. 17, 2024

(54) DRIVING EVALUATION DEVICE, DRIVING EVALUATION METHOD, AND DRIVING EVALUATION PROGRAM

(71) Applicant: TOYOTA JIDOSHA KABUSHIKI KAISHA, Toyota (JP)

(72) Inventor: Shuhei Manabe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 329 days.

(21) Appl. No.: 17/591,895

(22) Filed: Feb. 3, 2022

(65) Prior Publication Data

US 2022/0309841 A1 Sep. 29, 2022

(30) Foreign Application Priority Data

Mar. 26, 2021 (JP) ................................ 2021-054129

(51) Int. Cl.
*G07C 5/00* (2006.01)
*G07C 5/02* (2006.01)

(52) U.S. Cl.
CPC ............... *G07C 5/02* (2013.01); *G07C 5/008* (2013.01)

(58) Field of Classification Search
None
See application file for complete search history.

(56) References Cited

U.S. PATENT DOCUMENTS

2017/0305433 A1 10/2017 Yoshii et al.
2022/0138504 A1 * 5/2022 Fathi Moghadam .. G06N 20/20 706/12

FOREIGN PATENT DOCUMENTS

JP 2017-194872 A 10/2017
JP 2018-126190 A 8/2018
JP 2019-079151 A 5/2019
WO WO-2009104255 A1 * 8/2009 ........... B60W 40/08

OTHER PUBLICATIONS

Machine translation of Suzuki (WO 2009104255 A1), translation obtained Feb. 15, 2024 (Year: 2024).*
"Z-Score: Definition, Formula and Calculation", archived Feb. 17, 2018, Statistics How To (Year: 2018).*

* cited by examiner

*Primary Examiner* — Todd Melton
*Assistant Examiner* — Sarah A. Mueller
(74) *Attorney, Agent, or Firm* — Dinsmore & Shohl LLP

(57) ABSTRACT

A driving evaluation device includes: an acquisition unit that acquires at least one of vehicle information related to a vehicle state and driving information related to a driving state of drivers; a determination unit that determines whether a predetermined failure operation related to driving has been performed based on at least one of the vehicle information and the driving information acquired by the acquisition unit; and a calculation unit that calculates a failure operation probability that is a probability that the failure operation was performed, based on the failure operation determined by the determination unit, and uses a Z score of the failure operation probability calculated based on the failure operation probability to calculate an evaluation value related to the driving of the drivers.

3 Claims, 5 Drawing Sheets

DRIVING EVALUATION DEVICE, DRIVING EVALUATION METHOD, AND DRIVING EVALUATION PROGRAM

CROSS-REFERENCE TO RELATED APPLICATION

This application claims priority to Japanese Patent Application No. 2021-054129 filed on Mar. 26, 2021, incorporated herein by reference in its entirety.

BACKGROUND

1. Technical Field

The present disclosure relates to a driving evaluation device, a driving evaluation method, and a driving evaluation program.

2. Description of Related Art

Japanese Unexamined Patent Application Publication No. 2019-79151 (JP 2019-79151 A) discloses a technique for evaluating a driver's driving skill by comparing reference data indicating a criterion for whether the driver is performing an appropriate behavior with the behavior of the driver. Specifically, in the technique of JP 2019-79151 A, the evaluation is marked as good when the behavior of the driver exceeds the corresponding reference data, and the evaluation is marked as bad when the behavior falls below the corresponding reference data.

SUMMARY

However, in the technique of JP 2019-79151 A, the evaluation is high when the behavior per unit time of a driver who should have a low evaluation happens to be appropriate, and the evaluation is low when the behavior per unit time of a driver who should have a high evaluation happens to be inappropriate. Therefore, the technique of JP 2019-79151 A is easily affected by external factors such as the traveling environment of the vehicle and the difference between the vehicles in the evaluation, and there is room for improvement from the viewpoint of evaluating the driving of the driver.

Therefore, an object of the present disclosure is to provide a driving evaluation device, a driving evaluation method, and a driving evaluation program that can reduce the influence of the external factors such as the traveling environment of the vehicle and the difference between the vehicles when evaluating the driving of the driver.

A driving evaluation device according to a first aspect of the disclosure includes: an acquisition unit that acquires at least one of vehicle information related to a vehicle state and driving information related to a driving state of drivers; a determination unit that determines whether a predetermined failure operation related to driving has been performed based on at least one of the vehicle information and the driving information acquired by the acquisition unit; and a calculation unit that calculates a failure operation probability that is a probability that the failure operation was performed, based on the failure operation determined by the determination unit, and uses a Z score of the failure operation probability calculated based on the failure operation probability to calculate an evaluation value related to the driving of the drivers.

In the driving evaluation device according to the above aspect, the acquisition unit acquires at least one of the vehicle information and the driving information. Further, the determination unit determines whether a failure operation has been performed based on at least one of the vehicle information and the driving information acquired by the acquisition unit. Further, the calculation unit calculates a failure operation probability based on the failure operation determined by the determination unit, and uses a Z score to calculate an evaluation value of the drivers. Here, the Z score is a score converted so that the average is zero and the standard deviation is one. As a result, in the driving evaluation device, the driver's evaluation value is calculated using the Z score, enabling the driving of the driver to be evaluated using an index such as a deviation value. Therefore, according to the driving evaluation device, when evaluating the driving of the driver, it is possible to reduce the influence of external factors such as the traveling environment of the vehicle and the difference between the vehicles.

In the above aspect of the driving evaluation device, when calculating an nth evaluation value of a driver i who is a member of the drivers, assuming that an assumed failure operation probability in which the failure operation probability of the driver i is assumed is $\tilde{F}^i_n$, an average value of the assumed failure operation probabilities of all the drivers including the driver i is $\tilde{\mu}_n$, a standard deviation of the assumed failure operation probabilities of all the drivers including the driver i is $\tilde{\sigma}_n$, the failure operation probability from a start of driving of a vehicle by the driver i to a current time is T, the calculation unit may calculate $\tilde{Z}^i_n$ that is the Z score of the driver i using the following expression (1), and calculate $Score^i$ that is the evaluation value of the driver i using the following expression (2) in which Zmin indicates a lower limit of the Z score, Zmax indicates an upper limit of the Z score, Smin indicates a lower limit of the evaluation value, and Smax indicates an upper limit of the evaluation value.

Expression 1

$$\tilde{z}^i_n = \frac{T - \tilde{\mu}_n}{\tilde{\sigma}_n} \tag{1}$$

Expression 2

$$\mathrm{Score}^i = \frac{S_{min} - S_{max}}{Z_{min} - Z_{max}} \tilde{z}^i_n + \frac{S_{max}Z_{min} - S_{min}Z_{max}}{Z_{min} - Z_{max}} \tag{2}$$

According to the above aspect, the calculation unit calculates $\tilde{Z}^i_n$ using the above expression (1) and calculates $Score^i$ using the above expression (2). As a result, with the driving evaluation device, even when the failure operation probability per unit time of the driver happens to be high or low, the influence of the failure operation probability on the evaluation value can be reduced by using the assumed failure operation probability in which the failure operation probability is assumed.

In the above aspect of the driving evaluation device, assuming that a desired sampling time is $\hat{t}$ and a desired cutoff frequency is $\hat{f}_c$, the calculation unit may calculate a variable r using the following expression (3), and calculates the assumed failure operation probability $\tilde{F}_n^{\,i}$ of the driver i using the following expression (4).

Expression 3

$$r=\cos(2\pi\hat{f}_c\hat{t})-1+\sqrt{\{\cos(2\pi\hat{f}_c\hat{t})-1\}^2+2-2\cos(2\pi\hat{f}_c\hat{t})}$$

(3)

Expression 4

$$\tilde{F}_n^{\,i}=(1-r)\tilde{F}_{n-1}^{\,i}+rF_n^{\,i} \quad (4)$$

According to the above aspect, the calculation unit calculates a variable r using the above expression (3) and calculates $\tilde{F}^i_n$ using the above expression (4). As a result, with the driving evaluation device, by adjusting the value of the variable r, it is possible to cut off the variable component of the desired number of days or less.

A driving evaluation method according to a second aspect of the disclosure includes: acquiring at least one of vehicle information related to a vehicle state and driving information related to a driving state of a driver; determining whether a predetermined failure operation related to driving has been performed based on at least one of the vehicle information and the driving information that has been acquired; and calculating a failure operation probability that is a probability that the failure operation was performed based on the failure operation that has been determined, and using a Z score of the failure operation probability calculated based on the failure operation probability to calculate an evaluation value related to the driving of the driver.

A driving evaluation program according to a third aspect of the disclosure causes a computer to execute: acquiring at least one of vehicle information related to a vehicle state and driving information related to a driving state of a driver; determining whether a predetermined failure operation related to driving has been performed based on at least one of the vehicle information and the driving information that has been acquired; and calculating a failure operation probability that is a probability that the failure operation was performed based on the failure operation that has been determined, and using a Z score of the failure operation probability calculated based on the failure operation probability to calculate an evaluation value related to the driving of the driver.

As described above, the driving evaluation device, the driving evaluation method, and the driving evaluation program according to the present disclosure can reduce the influence of the external factors such as the traveling environment of the vehicle and the difference between the vehicles when evaluating the driving of the driver.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
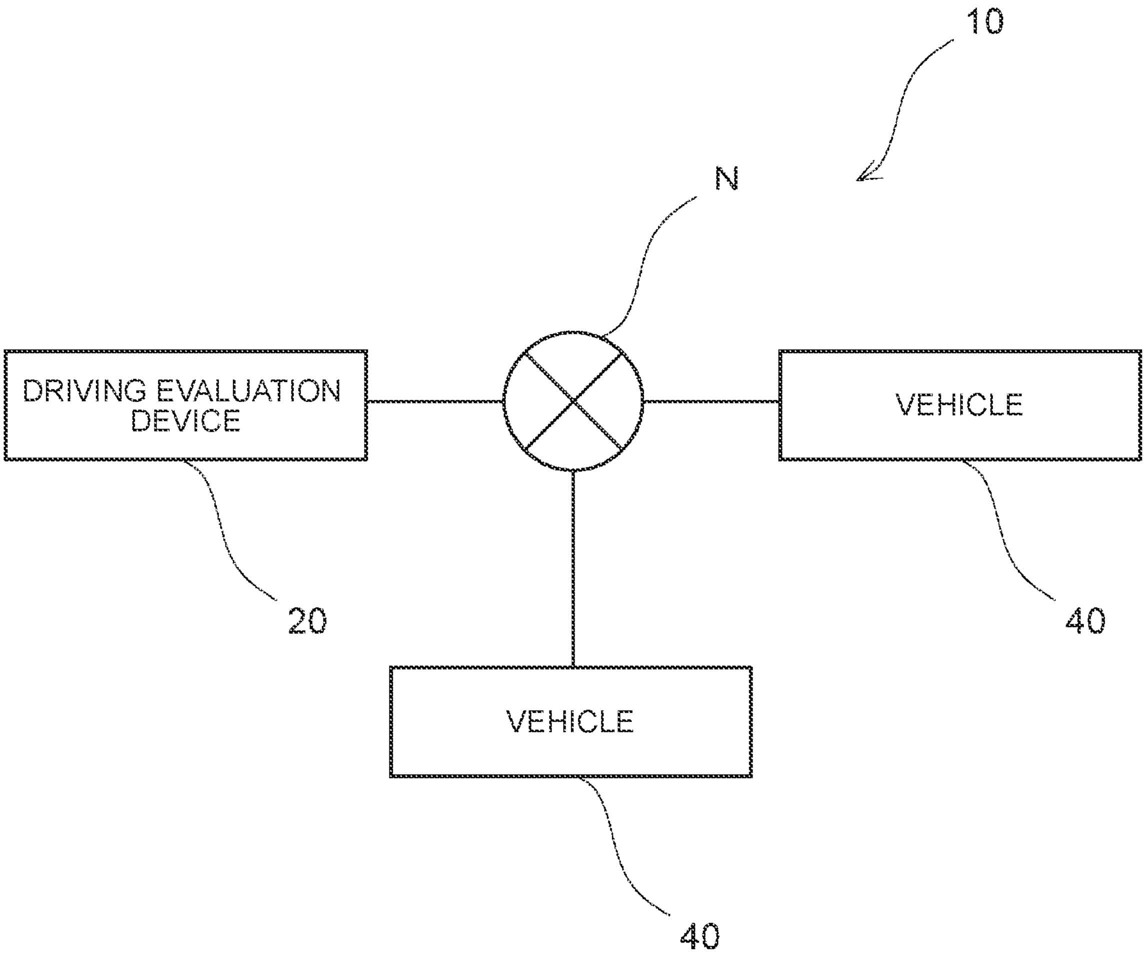
FIG. 1 is a diagram showing a schematic configuration of a driving evaluation system according to the present embodiment.

Hereinafter, a driving evaluation system 10 according to the present embodiment will be described. The driving evaluation system 10 according to the present embodiment is a system in which a business operator operating a vehicle, such as a taxi company and a transportation company, evaluates the driving operation and the like of their drivers. FIG. 1 is a diagram showing a schematic configuration of the driving evaluation system 10.

As shown in FIG. 1, the driving evaluation system 10 includes a driving evaluation device 20 and a vehicle 40. The driving evaluation device 20 and the vehicle 40 are connected to each other via a network N so as to be communicable with each other. The vehicle 40 connected to the network N is, for example, a vehicle that travels while carrying a user.

The driving evaluation device 20 is a server computer owned by a business operator that manages the vehicle 40. The vehicle 40 may be a gasoline vehicle, a hybrid vehicle, or an electric vehicle, but in the present embodiment, the vehicle 40 is a gasoline vehicle as an example.

Figure 2:
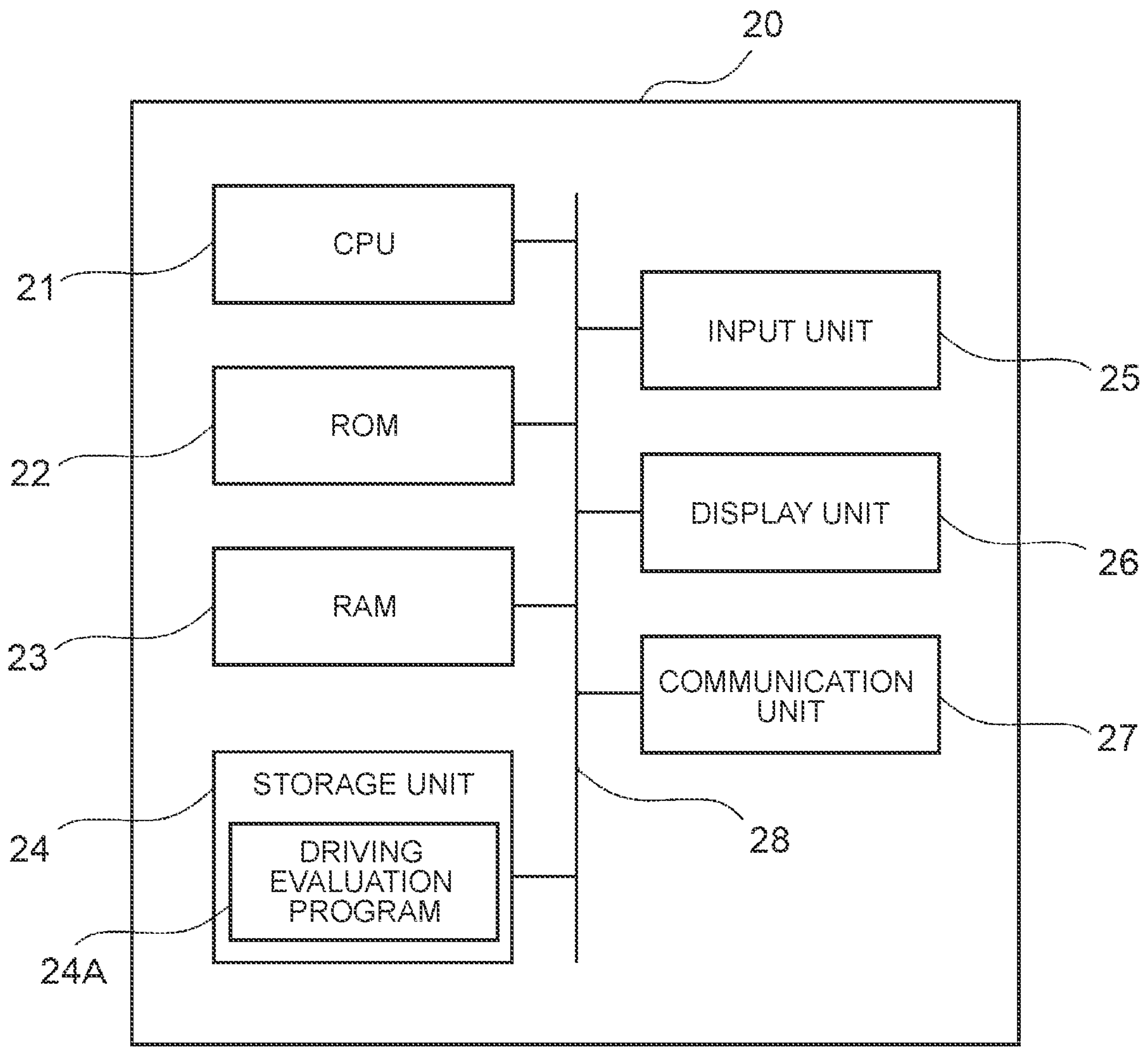
FIG. 2 is a block diagram showing a hardware configuration of a driving evaluation device according to the present embodiment.

Next, a hardware configuration of the driving evaluation device 20 will be described. FIG. 2 is a block diagram showing a hardware configuration of the driving evaluation device 20.

As shown in FIG. 2, the driving evaluation device 20 includes a central processing unit (CPU) 21, a read only memory (ROM) 22, a random access memory (RAM) 23, a storage unit 24, an input unit 25, a display unit 26, and a communication unit 27. Each configuration is communicably connected to each other via a bus 28.

The CPU 21 is a central processing unit that executes various programs and that controls various units. That is, the CPU 21 reads the program from the ROM 22 or the storage unit 24 and executes the program using the RAM 23 as a work area. The CPU 21 controls each of the above configurations and performs various arithmetic processes in accordance with the program recorded in the ROM 22 or the storage unit 24.

The ROM 22 stores various programs and various data. The RAM 23 temporarily stores a program or data as a work area.

The storage unit 24 is composed of a storage device such as a hard disk drive (HDD), a solid state drive (SSD), or a flash memory, and stores various programs and various data. In the present embodiment, the storage unit 24 stores at least a driving evaluation program 24A for executing a calculation process described later.

The input unit 25 includes a pointing device such as a mouse, a keyboard, a microphone, a camera, and the like, and is used for performing various inputs.

The display unit 26 is, for example, a liquid crystal display and displays various types of information. A touch panel may be adopted as the display unit 26 and may function as the input unit 25.

The communication unit 27 is an interface for communicating with other devices. For the communication, for example, a wired communication standard such as Ethernet (registered trademark) or fiber-distributed data interface (FDDI), or a wireless communication standard such as fourth generation (4G), fifth generation (5G), or Wi-Fi (registered trademark) is used.

When executing the above-mentioned driving evaluation program 24A, the driving evaluation device 20 executes the processes based on the above-mentioned driving evaluation program 24A by using the above-mentioned hardware resources.

Figure 3:
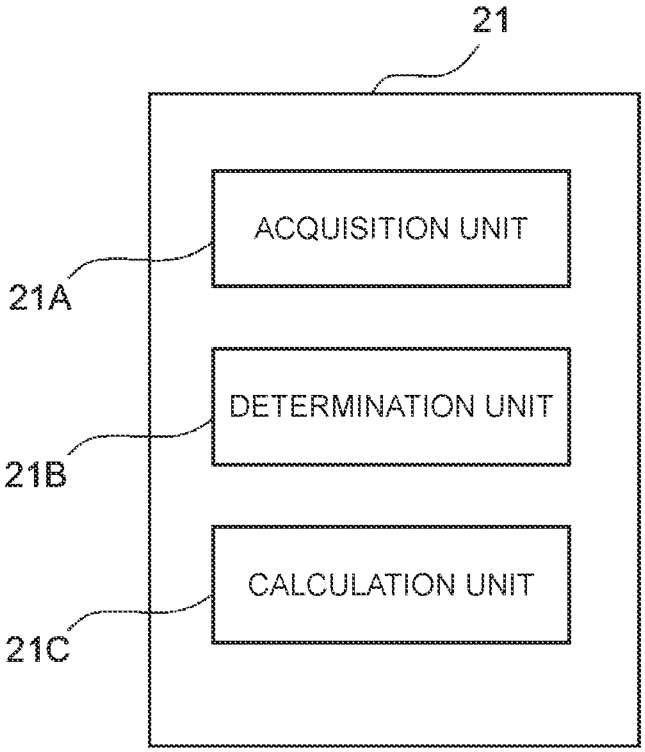
FIG. 3 is a block diagram showing an example of a functional configuration of the driving evaluation device according to the present embodiment.

Next, the functional configuration of the driving evaluation device 20 will be described. FIG. 3 is a block diagram showing an example of a functional configuration of the driving evaluation device 20 according to the present embodiment.

As shown in FIG. 3, the CPU 21 of the driving evaluation device 20 has an acquisition unit 21A, a determination unit 21B, and a calculation unit 21C as functional configurations. Each functional configuration is realized when the CPU 21 reads and executes the driving evaluation program 24A stored in the storage unit 24.

The acquisition unit 21A acquires at least one of vehicle information related to a vehicle state and driving information related to a driving state of the driver. In the present embodiment, as an example, the acquisition unit 21A acquires both the vehicle information and the driving information. Specifically, the acquisition unit 21A acquires the steering angle, acceleration, and speed of the vehicle 40 respectively detected by a steering angle sensor 51, an acceleration sensor 52, and a vehicle speed sensor 53 included in the vehicle 40, which are described later, as the vehicle information. In addition, the acquisition unit 21A acquires an image captured by a camera 55 included in the vehicle 40, which is described later, as the driving information.

The determination unit 21B determines whether a predetermined failure operation related to driving has been performed based on at least one of the vehicle information and the driving information acquired by the acquisition unit 21A. As an example, in the present embodiment, sudden steering operation, sudden acceleration operation, sudden braking operation, and lane protrusion operation are provided as failure operations.

The sudden steering operation is determined based on the information detected by the steering angle sensor 51. As an example, the determination unit 21B determines that the sudden steering operation has been performed when the amount of change in the steering angle within the predetermined time is equal to or greater than a predetermined value.

The sudden acceleration operation and the sudden braking operation are determined based on the information detected by the acceleration sensor 52. As an example, the determination unit 21B determines that the sudden acceleration operation or the sudden braking operation has been performed when an acceleration equal to or greater than a predetermined value in a predetermined direction is detected by the acceleration sensor 52.

The lane protrusion operation is determined based on the image of the front of the vehicle captured by the above-mentioned camera 55. As an example, the determination unit 21B determines that the lane protrusion operation has been performed when the position of the vehicle 40 is deviated by a predetermined amount or more with respect to the image of the front of the vehicle captured by the camera 55.

The calculation unit 21C calculates a failure operation probability that is a probability that the failure operation was performed based on the failure operation determined by the determination unit 21B, and uses a Z score of the failure operation probability calculated based on the failure operation probability to calculate the evaluation value related to the driving of the driver. The calculation method of the failure operation probability, the Z score of the failure operation probability, and the evaluation value performed by the calculation unit 21C will be described later.

Figure 4:
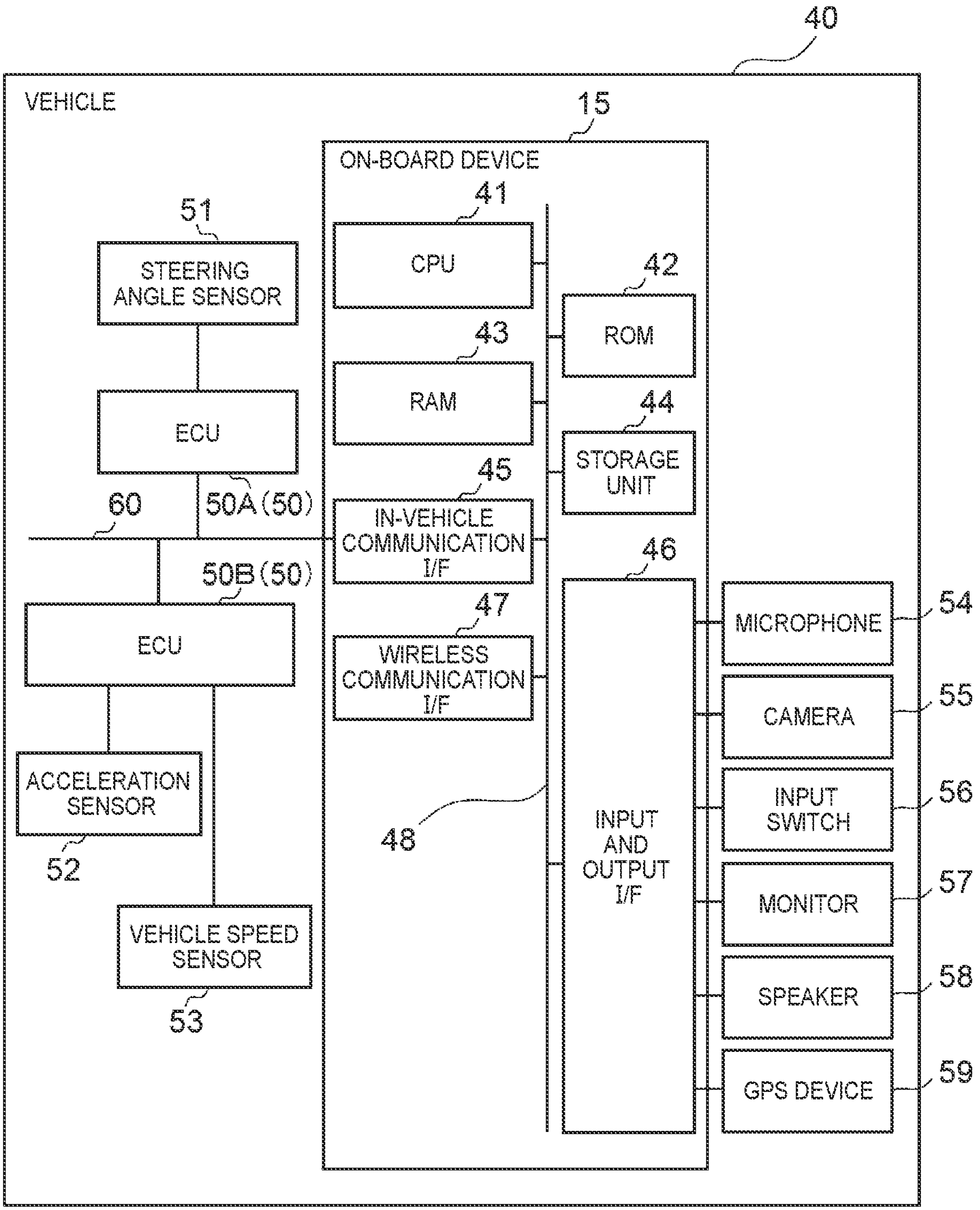
FIG. 4 is a block diagram showing a hardware configuration of a vehicle according to the present embodiment.

Next, the hardware configuration of the vehicle 40 will be described. FIG. 4 is a block diagram showing a hardware configuration of the vehicle 40.

As shown in FIG. 4, the vehicle 40 is configured to include an on-board device 15, a plurality of electronic control units (ECUs) 50, the steering angle sensor 51, the acceleration sensor 52, the vehicle speed sensor 53, a microphone 54, the camera 55, an input switch 56, a monitor 57, a speaker 58, and a global positioning system (GPS) device 59.

The on-board device 15 is configured to include a CPU 41, a ROM 42, a RAM 43, a storage unit 44, an in-vehicle communication interface (I/F) 45, an input and output I/F 46, and a wireless communication I/F 47. The CPU 41, the ROM 42, the RAM 43, the storage unit 44, the in-vehicle communication I/F 45, the input and output I/F 46, and the wireless communication I/F 47 are connected to each other so as to be communicable with each other via an internal bus 48.

The CPU 41 is a central processing unit that executes various programs and that controls various units. That is, the CPU 41 reads the program from the ROM 42 or the storage unit 44 and executes the program using the RAM 43 as a work area. The CPU 41 controls each of the above configurations and performs various arithmetic processes in accordance with the program recorded in the ROM 42 or the storage unit 44.

The ROM 42 stores various programs and various data. The RAM 43 temporarily stores a program or data as a work area.

The storage unit 44 is composed of a storage device such as an HDD, an SSD, or a flash memory, and stores various programs and various data.

The in-vehicle communication I/F 45 is an interface for connecting to the ECU 50. For the interface, a communication standard based on a controller area network (CAN) protocol is used. The in-vehicle communication I/F 45 is connected to an external bus 60.

The ECU 50 is provided for each function of the vehicle 40, and in the present embodiment, an ECU 50A and an ECU 50B are provided. The ECU 50A is exemplified by an electric power steering ECU, and the steering angle sensor 51 is connected to the ECU 50A. Further, as the ECU 50B, an ECU for vehicle stability control (VSC) is exemplified, and the acceleration sensor 52 and the vehicle speed sensor 53 are connected to the ECU 50B. In addition to the acceleration sensor 52 and the vehicle speed sensor 53, a yaw rate sensor may be connected to the ECU 50B.

The steering angle sensor 51 is a sensor for detecting the steering angle of the steering wheel. The steering angle detected by the steering angle sensor 51 is stored in the storage unit 44 and transmitted to the driving evaluation device 20 as the vehicle information.

The acceleration sensor 52 is a sensor for detecting the acceleration acting on the vehicle 40. The acceleration sensor 52 is, for example, a three-axis acceleration sensor that detects the acceleration applied in the vehicle front-rear direction as the X-axis direction, the vehicle width direction as the Y-axis direction, and the vehicle height direction as the Z-axis direction. The acceleration detected by the acceleration sensor 52 is stored in the storage unit 44 and transmitted to the driving evaluation device 20 as the vehicle information.

The vehicle speed sensor 53 is a sensor for detecting the speed of the vehicle 40. The vehicle speed sensor 53 is, for example, a sensor provided on a wheel. The speed detected by the vehicle speed sensor 53 is stored in the storage unit 44 and transmitted to the driving evaluation device 20 as the vehicle information.

The input and output I/F 46 is an interface for communicating with the microphone 54, the camera 55, the input switch 56, the monitor 57, the speaker 58, and the GPS device 59 mounted on the vehicle 40.

The microphone 54 is a device provided on the front pillar, a dashboard, or the like of the vehicle 40, and collects voices emitted by the driver of the vehicle 40. The microphone 54 may be provided in the camera 55, which will be described later.

The camera 55 is configured to include a charge coupled device (CCD) image sensor as an example. The camera 55 is provided, for example, at the front portion of the vehicle 40 and captures an image of the front of the vehicle. The image captured by the camera 55 is used, for example, for recognizing the inter-vehicle distance with the preceding vehicle traveling in front of the vehicle, the lanes, the traffic lights, and the like. The image captured by the camera 55 is stored in the storage unit 44 and transmitted to the driving evaluation device 20 as the driving information. The camera 55 may be configured as an imaging device for other purposes such as a driving recorder. Further, the camera 55 may be connected to the on-board device 15 via the ECU 50 (for example, a camera ECU).

The input switch 56 is provided on the instrument panel, the center console, the steering wheel, or the like, and is a switch for inputting an operation by the driver's fingers. As the input switch 56, for example, a push button type numeric keypad, a touch pad, or the like can be adopted.

The monitor 57 is a liquid crystal monitor provided on an instrument panel, a meter panel, or the like, for displaying an image of an operation proposal related to a function of the vehicle 40 and an explanation of the function. The monitor 57 may be provided as a touch panel that also serves as the input switch 56.

The speaker 58 is a device provided on an instrument panel, a center console, a front pillar, a dashboard, or the like, for outputting a voice for an operation proposal related to a function of the vehicle 40 and an explanation of the function. The speaker 58 may be provided on the monitor 57.

The GPS device 59 is a device that measures the current position of the vehicle 40. The GPS device 59 includes an antenna (not shown) that receives signals from GPS satellites. The GPS device 59 may be connected to the on-board device 15 via a car navigation system connected to the ECU 50 (for example, a multimedia ECU).

The wireless communication I/F 47 is a wireless communication module for communicating with the driving evaluation device 20. For the wireless communication module, for example, communication standards such as 5G, long term evolution (LTE), and Wi-Fi (registered trademark) are used. The wireless communication I/F 47 is connected to the network N.

Figure 5:
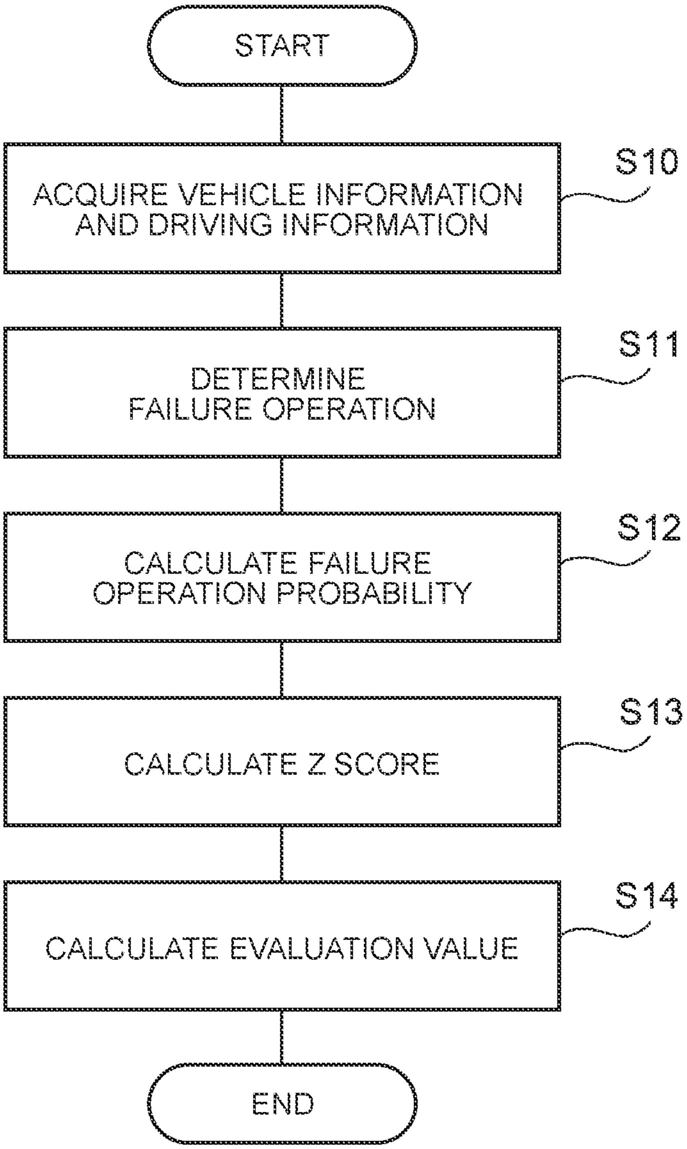
FIG. 5 is a flowchart showing a flow of a calculation process performed by the driving evaluation device according to the present embodiment.

FIG. 5 is a flowchart showing a flow of a calculation process for calculating an evaluation value related to the driver's driving by the driving evaluation device 20. The calculation process is performed when the CPU 21 reads the driving evaluation program 24A from the storage unit 24, expands the driving evaluation program 24A into the RAM 23, and executes the program. In the following, a case where the evaluation value of a driver i who is the driver of the vehicle 40 is calculated will be described as an example.

In step S10 shown in FIG. 5, the CPU 21 acquires the vehicle information and the driving information from the vehicle 40. Then, the process proceeds to step S11. In the present embodiment, the vehicle information and the driving information are transmitted from the vehicle 40 to the driving evaluation device 20 every 10 minutes.

In step S11, the CPU 21 determines whether a failure operation has been performed in the last 10 minutes based on at least one of the vehicle information and the driving information acquired in step S10. Then, the process proceeds to step S12.

In step S12, the CPU 21 calculates the failure operation probability that is a probability that the failure operation was performed from the start of driving of the vehicle 40 by the driver i to the current time, based on the failure operation determined in step S11. Then, the process proceeds to step S13. As an example, the failure operation probability is a value obtained by dividing the number of failure operations from the start of driving of the vehicle 40 to the current time by the time from the start of driving of the vehicle 40 to the current time, and multiplying the value by 100(%).

In step S13, the CPU 21 calculates the Z score of the failure operation probability based on the failure operation probability calculated in step S12. Then, the process proceeds to step S14. The Z score is a score converted so that the average is zero and the standard deviation is one.

Here, when calculating the evaluation value for the nth time of the driver i, assuming that the assumed failure operation probability in which the failure operation probability of the driver i is assumed is $\tilde{F}^i_n$, the average value of the assumed failure operation probabilities of all the drivers including the driver i is $\tilde{\mu}_n$, the standard deviation of the assumed failure operation probabilities of all the drivers including the driver i is $\tilde{\sigma}_n$, the failure operation probability from the start of driving of the vehicle 40 by the driver i to the current time is T, the CPU 21 calculates $\tilde{Z}^i_n$, which is the Z score of the driver i, using the following expression (5).

The assumed failure operation probability is a failure operation probability that is assumed in consideration of the traveling environment, human factors, vehicle environment, seasonal fluctuation factors, and the like. The traveling environment includes, for example, whether the road is a familiar road or a road traveling for the first time, the number of traveling vehicles, and the like.

The human factors include, for example, age, years of work experience, and the like. The vehicle environment includes, for example, whether the driver is familiar with driving the vehicle or drives the vehicle for the first time. The seasonal fluctuation factors include, for example, climatic factors, busy factors, and the like.

Expression 5

$$\tilde{z}^i_n = \frac{T - \tilde{\mu}_n}{\tilde{\sigma}_n} \tag{5}$$

Further, assuming that a desired sampling time is $\hat{t}$ and a desired cutoff frequency is $\tilde{f}_c$, the CPU 21 calculates the variable r using the following expression (6) and calculates $\hat{F}^i_n$ that is the assumed failure operation probability of the driver i using the following expression (7). Here, the unit of $\hat{t}$ is seconds.

Expression 6

$$r = \cos(2\pi \hat{f}_c \hat{t}) - 1 + \sqrt{\{\cos(2\pi \hat{f}_c \hat{t}) - 1\}^2 + 2 - 2\cos(2\pi \hat{f}_c \hat{t})} \tag{6}$$

Expression 7

$$\tilde{F}_n{}^i = (1-r)\tilde{F}_{n-1}{}^i + rF_n{}^i \tag{7}$$

In step S14, the CPU 21 calculates the evaluation value of the driver i using the Z score of the failure operation probability calculated in step S13. Then, the process ends.

Here, the CPU 21 calculates $Score^i$ that is the evaluation value of the driver i using the following expression (8) in which Zmin indicates the lower limit of the Z score, Zmax indicates the upper limit of the Z score, Smin indicates the lower limit of the evaluation value, and Smax indicates the upper limit of the evaluation value. In the present embodiment, as an example, Zmin is set to "−3", Zmax is set to "3", Smin is set to "30", and Smax is set to "100".

Expression 8

$$Score^i = \frac{S_{min} - S_{max}}{Z_{min} - Z_{max}} \bar{z}_n^i + \frac{S_{max}Z_{min} - S_{min}Z_{max}}{Z_{min} - Z_{max}} \tag{8}$$

Through the above processing, the CPU 21 of the driving evaluation device 20 calculates the evaluation value of each driver every 10 minutes. Then, the CPU 21 stores the calculated evaluation value in the storage unit 24 associating the evaluation value for each driver with the date and time when the evaluation value is calculated. The evaluation value for each driver stored in the storage unit 24 is displayed on the display unit 26 by performing a predetermined operation on the input unit 25, and can be confirmed by the manager (operation manager) of the business operator.

Here, when a business operator operating a vehicle such as a taxi company or a transportation company calculates an evaluation value for each of a plurality of drivers, it is necessary to design the calculation method so that the value of a good driver whose number of accidents and number of near miss cases within a predetermined time are less than a predetermined number of times is higher than the value of a dangerous driver whose number of accidents and number of near miss cases within the predetermined time are equal to or more than the predetermined number of times. The near miss case means a dangerous situation that is close to an accident, which does not result in an accident but may directly lead to an accident. The "dangerous situation" is, for example, a case where the amount of change in the steering angle within a predetermined time is equal to or greater than a predetermined value, and a case where the acceleration is equal to or greater than a predetermined value, that is, a case where a collision is detected.

Since there is a possibility that both a good driver and a dangerous driver perform a failure operation, a calculation method is not desirable in which the evaluation value is low when the driver's failure operation probability per unit time happens to be high, and the evaluation value is high when the driver's failure operation probability per unit time happens to be low.

Therefore, in the present embodiment, the CPU 21 acquires at least one of the vehicle information and the driving information. Further, the CPU 21 determines whether the failure operation has been performed based on at least one of the acquired vehicle information and driving information. Then, the CPU 21 calculates the failure operation probability based on the determined failure operation, and calculates the evaluation value of the driver using the Z score. As a result, in the driving evaluation device 20 according to the present embodiment, the driver's evaluation value is calculated using the Z score, enabling the driving of the driver to be evaluated using an index such as a deviation value. Therefore, according to the driving evaluation device 20, when evaluating the driving of the driver, it is possible to reduce the influence of external factors such as the traveling environment of the vehicle and the difference between the vehicles.

The failure operation probability varies depending on the traveling environment, the human factors, the vehicle environment, the seasonal fluctuation factors, and the like. As an example, the failure operation probability fluctuates depending on whether the road is a familiar road or a road traveling for the first time as the traveling environment, and whether the weather is sunny or rainy as a climatic factor of the seasonal fluctuation factors.

Therefore, in the present embodiment, the CPU 21 calculates the Z score of the driver's failure operation probability using the above expression (5), and calculates the driver's evaluation value using the above expression (8). As a result, with the driving evaluation device 20 according to the present embodiment, even when the failure operation probability per unit time of the driver happens to be high or low, the influence of the failure operation probability on the evaluation value can be reduced by using the assumed failure operation probability in which the failure operation probability is assumed.

Further, in the present embodiment, the CPU 21 calculates the variable r using the above expression (6), and calculates the assumed failure operation probability of the driver using the above expression (7). As a result, with the driving evaluation device 20 according to the present embodiment, by adjusting the value of the variable r, it is possible to cut off the variable component of the desired number of days or less. According to the driving evaluation device 20, a low-pass filter having a cutoff frequency of $\hat{f}_c$ can be obtained. As an example, according to the driving evaluation device 20, assuming that the cutoff frequency $\hat{f}_c$ is 0.0000116 (Hz), variable components of one day (86400 seconds) or less can be cut off.

Here, assuming that a desired sampling time $\hat{t}$ is 600 (seconds) and the cutoff frequency $\hat{f}_c$ is 0.0000116 (Hz), the value of the variable r calculated using the above expression (6) is "0.04278". Therefore, assuming that the variable r is 0.04278, the above expression (7) is expressed by the following expression (9).

Expression 9

$$\bar{F}_n^i = 0.95722\bar{F}_{n-1}^i + 0.04278F_n^i \tag{9}$$

Others

In the above embodiment, the failure operation probability is calculated by using the number of failure operations from the start of driving of the vehicle 40 to the current time, but the calculation method of the failure operation probability is not limited to this. As an example, weighting may be performed for each type of failure operation, the failure operation score for the failure operations from the start of driving of the vehicle 40 to the current time may be calculated, and the calculated failure operation score may be used to calculate the failure operation probability. The failure operation probability (%) in this case is calculated by the CPU 21 by dividing the failure operation score from the start of driving of the vehicle 40 to the current time by the time from the start of driving of the vehicle 40 to the current time, and by multiplying the value by 100. It should be noted that the above weighting may be performed by using, instead of or in addition to performing the weighting for each type of failure operation, the degree of deviation from a reference value, the traveling position where the failure operation was performed, whether a user is on the vehicle, years of work experience of the driver, and the like.

In the above embodiment, it is assumed that the sudden steering operation, the sudden acceleration operation, the sudden braking operation, and the lane protrusion operation are provided as the failure operation, but the types of the failure operation may be more or less than this. Further, the number of driving operations determined as the failure operations may be changed depending on the age of the driver. As an example, the older the driver is, the greater the number of driving operations determined to be a failure operation may be. Specifically, a driver aged 60 or over may have a larger number of driving operations determined as a failure operation than a driver under the age of 60.

In the above embodiment, the evaluation value for each driver is stored in the storage unit 24 of the driving evaluation device 20, is displayed on the display unit 26 by performing a predetermined operation on the input unit 25, and is able to be confirmed by the operation manager. However, the evaluation value of the driver is not limited to being confirmable only by the operation manager, and may be confirmed by the driver himself/herself. As an example, when the calculated evaluation value is lower than a predetermined value, the CPU 21 may transmit the evaluation value to a mobile terminal such as a smartphone or the like held by the driver corresponding to the evaluation value and a vehicle driven by the driver.

When the evaluation value can be confirmed by the driver, it is desirable to transmit advice information that contributes to the improvement of the evaluation value, in addition to the evaluation value. A plurality of types of advice information is provided and stored in advance in the storage unit 24 of the driving evaluation device 20. The CPU 21 extracts the advice information corresponding to the driver from the storage unit 24, and transmits the advice information together with the evaluation value to the mobile terminal held by the driver and the vehicle driven by the driver.

Further, when the evaluation value can be confirmed by the driver, it is desirable that the operation manager can confirm whether the driver confirms the advice information. As an example, the configuration may be such that, when the driver displays the advice information transmitted from the driving evaluation device 20 on the mobile terminal or the vehicle, a confirmation notification indicating that the advice information has been confirmed is transmitted from the mobile terminal or the vehicle to the driving evaluation device 20.

Further, when the driving evaluation device 20 has not received the above confirmation notification for a predetermined time or longer, the driving evaluation device 20 may transmit a reminder notification urging the confirmation of the advice information to the mobile terminal held by the driver and the vehicle driven by the driver.

It should be noted that various processors other than the CPU may execute the calculation process that is executed when the CPU 21 reads the software (program) in the above embodiment. Examples of the processors in this case include a programmable logic device (PLD) such as a field-programmable gate array (FPGA) for which a circuit configuration can be changed after production, a dedicated electric circuit that is a processor having a circuit configuration designed exclusively for executing a specific process, such as an application specific integrated circuit (ASIC), and the like. The calculation process may be executed by one of these various processors, or a combination of two or more processors of the same type or different types (for example, a combination of FPGAs, a combination of a CPU and an FPGA, and the like). Further, the hardware structure of these various processors is, more specifically, an electric circuit in which circuit elements such as semiconductor elements are combined.

Further, in the above embodiment, the mode in which the driving evaluation program 24A is stored (installed) in the storage unit 24 in advance has been described, but the present disclosure is not limited to this. The driving evaluation program 24A may be recorded on a recording medium such as a compact disc read-only memory (CD-ROM), a digital versatile disc read-only memory (DVD-ROM), and a universal serial bus (USB) memory to be provided. Further, the driving evaluation program 24A may be downloaded from an external device via the network N.

What is claimed is:

1. A driving evaluation device comprising a central processing unit that:

acquires at least one of vehicle information related to a vehicle state and driving information related to a driving state of drivers;

determines whether a predetermined failure operation related to driving has been performed based on at least one of the vehicle information and the driving information acquired; and calculates a failure operation probability that is a probability that the failure operation was performed, based on the failure operation determined, and uses a Z score of the failure operation probability calculated based on the failure operation probability to calculate an evaluation value related to the driving of the drivers, wherein when calculating an nth evaluation value of a driver i who is a member of the drivers, assuming that an assumed failure operation probability in which the failure operation probability of the driver i is assumed is $\tilde{F}^i_n$, an average value of the assumed failure operation probabilities of all the drivers including the driver i is $\tilde{\mu}_n$, a standard deviation of the assumed failure operation probabilities of all the drivers including the driver i is $\tilde{\sigma}_n$, the failure operation probability from a start of driving of a vehicle by the driver i to a current time is T, the central processing unit:

calculates $\tilde{Z}^i_n$ that is the Z score of the driver i using a first expression, and calculates $Score^i$ that is the evaluation value of the driver i using a second expression in which Zmin indicates a lower limit of the Z score, Zmax indicates an upper limit of the Z score, Smin indicates a lower limit of the evaluation value, and Smax indicates an upper limit of the evaluation value, wherein the first expression is $$\tilde{z}^i_n = \frac{T - \tilde{\mu}_n}{\tilde{\sigma}_n},$$

wherein the second expression is $$\text{Score}^i = \frac{S_{min} - S_{max}}{Z_{min} - Z_{max}} \tilde{z}^i_n + \frac{S_{max} Z_{min} - S_{min} Z_{max}}{Z_{min} - Z_{max}},$$

wherein the evaluation value of a good driver is less than that of a dangerous driver and relative to a near miss case over a predetermined period of time, the near miss case including a case where an amount of change in a steering angle or an acceleration is equal to or greater than a predetermined value, and wherein the evaluation value is displayed for driver confirmation on a display unit by performing a predetermined operation on an input unit and transmitting advice information in response thereto to improve the evaluation value.

2. A driving evaluation method comprising:

acquiring at least one of vehicle information related to a vehicle state and driving information related to a driving state of a driver;

determining whether a predetermined failure operation related to driving has been performed based on at least one of the vehicle information and the driving information that has been acquired; and calculating a failure operation probability that is a probability that the failure operation was performed, based on the failure operation that has been determined, and using a Z score of the failure operation probability calculated based on the failure operation probability to calculate an evaluation value related to the driving of the driver, wherein when calculating an nth evaluation value of a driver i who is a member of the drivers, assuming that an assumed failure operation probability in which the failure operation probability of the driver i is assumed is $\tilde{F}^i_n$, an average value of the assumed failure operation probabilities of all the drivers including the driver i is $\tilde{\mu}_n$, a standard deviation of the assumed failure operation probabilities of all the drivers including the driver i is $\tilde{\sigma}_n$, the failure operation probability from a start of driving of a vehicle by the driver i to a current time is T, the method further comprising:

calculating $\tilde{Z}^i_n$ that is the Z score of the driver i using a first expression, and calculating $Score^i$ that is the evaluation value of the driver i using a second expression in which Zmin indicates a lower limit of the Z score, Zmax indicates an upper limit of the Z score, Smin indicates a lower limit of the evaluation value, and Smax indicates an upper limit of the evaluation value, wherein the first expression is $$\tilde{z}^i_n = \frac{T - \tilde{\mu}_n}{\tilde{\sigma}_n},$$

wherein the second expression is $$\mathrm{Score}^i = \frac{S_{min} - S_{max}}{z_{min} - z_{max}}\tilde{z}^i_n + \frac{S_{max}z_{min} - S_{min}z_{max}}{z_{min} - z_{max}},$$

wherein the evaluation value of a good driver is less than that of a dangerous driver and relative to a near miss case over a predetermined period of time, the near miss case including a case where an amount of change in a steering angle or an acceleration is equal to or greater than a predetermined value, and wherein the evaluation value is displayed for driver confirmation on a display unit by performing a predetermined operation on an input unit and transmitting advice information in response thereto to improve the evaluation value.

3. A driving evaluation program that causes a computer to execute:

acquiring at least one of vehicle information related to a vehicle state and driving information related to a driving state of a driver;

determining whether a predetermined failure operation related to driving has been performed based on at least one of the vehicle information and the driving information that has been acquired; and calculating a failure operation probability that is a probability that the failure operation was performed based on the failure operation that has been determined, and using a Z score of the failure operation probability calculated based on the failure operation probability to calculate an evaluation value related to the driving of the driver, wherein when calculating an nth evaluation value of a driver i who is a member of the drivers, assuming that an assumed failure operation probability in which the failure operation probability of the driver i is assumed is $\tilde{F}^i_n$, an average value of the assumed failure operation probabilities of all the drivers including the driver i is $\tilde{\mu}_n$, a standard deviation of the assumed failure operation probabilities of all the drivers including the driver i is $\tilde{\sigma}_n$, the failure operation probability from a start of driving of a vehicle by the driver i to a current time is T, the driving evaluation program that causes the computer to further execute:

calculating $\tilde{Z}^i_n$ that is the Z score of the driver i using a first expression, and calculating $Score^i$ that is the evaluation value of the driver i using a second expression in which Zmin indicates a lower limit of the Z score, Zmax indicates an upper limit of the Z score, Smin indicates a lower limit of the evaluation value, and Smax indicates an upper limit of the evaluation value, wherein the first expression is $$\tilde{z}^i_n = \frac{T - \tilde{\mu}_n}{\tilde{\sigma}_n},$$

wherein the second expression is $$\mathrm{Score}^i = \frac{S_{min} - S_{max}}{z_{min} - z_{max}}\tilde{z}^i_n + \frac{S_{max}z_{min} - S_{min}z_{max}}{z_{min} - z_{max}},$$

wherein the evaluation value of a good driver is less than that of a dangerous driver and relative to a near miss case over a predetermined period of time, the near miss case including a case where an amount of change in a steering angle or an acceleration is equal to or greater than a predetermined value, and wherein the evaluation value is displayed for driver confirmation on a display unit by performing a predetermined operation on an input unit and transmitting advice information in response thereto to improve the evaluation value.

* * * * *